R. P. WITT.
METHOD OF BLANCHING PEANUTS.
APPLICATION FILED JULY 9, 1920.
1,388,395.
Patented Aug. 23, 1921.
3 SHEETS—SHEET 2.
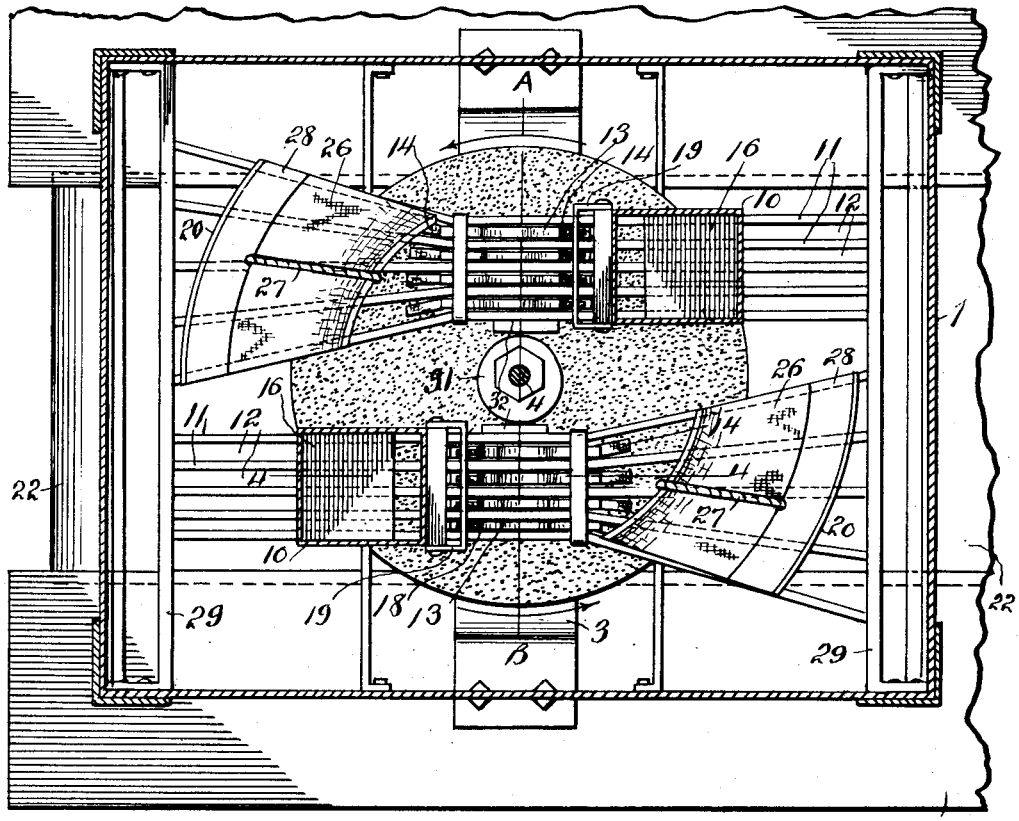
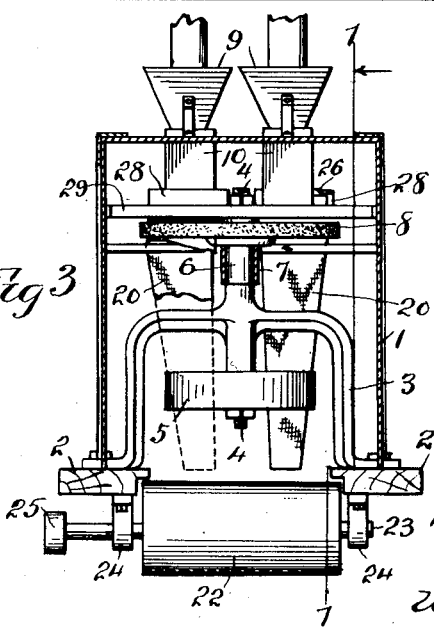
WITNESSES:
INVENTOR
Roscoe P. Witt
BY
Warren D. House
His ATTORNEY

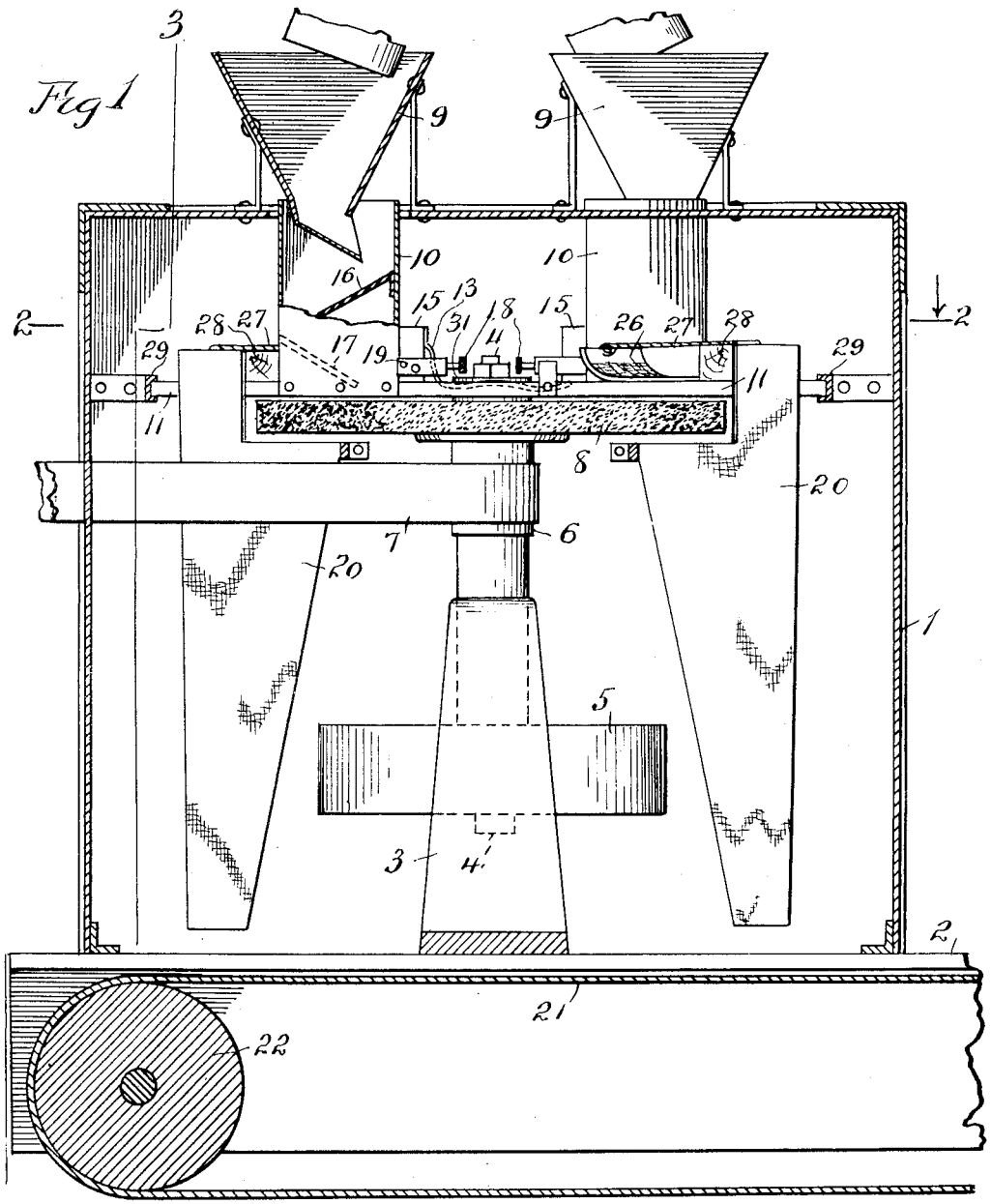

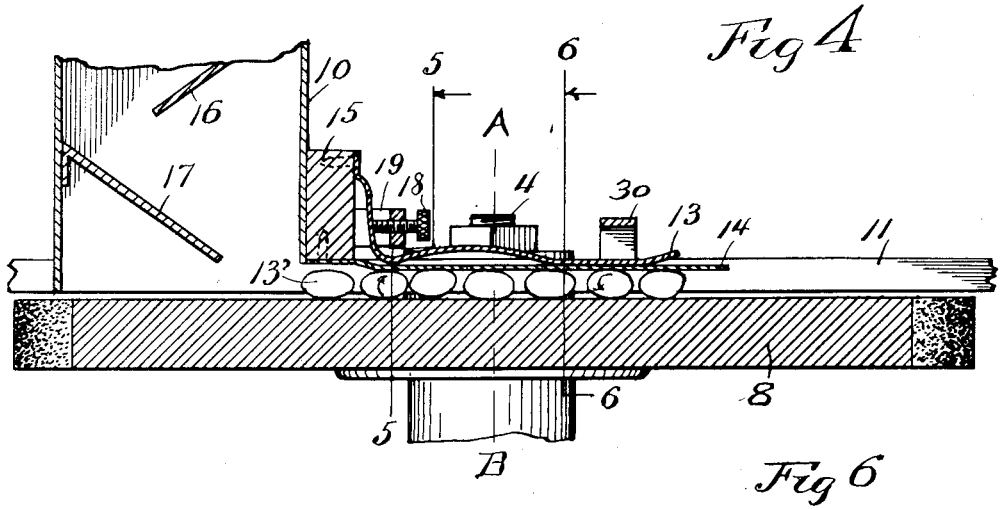

UNITED STATES PATENT OFFICE.

ROSCOE P. WITT, OF KANSAS CITY, KANSAS, ASSIGNOR TO RIDENOUR-BAKER GROCERY COMPANY, OF KANSAS CITY, MISSOURI, A CORPORATION OF MISSOURI.

METHOD OF BLANCHING PEANUTS.

1,388,395.   Specification of Letters Patent.   Patented Aug. 23, 1921.

Application filed July 9, 1920. Serial No. 394,875.

*To all whom it may concern:*

Be it known that I, ROSCOE P. WITT, a citizen of the United States, residing at Kansas City, in the county of Wyandotte and State of Kansas, have invented a certain new and useful Improvement in Methods of Blanching Peanuts, of which the following is a specification.

My invention relates to improvements in methods of blanching peanuts. It relates particularly to blanching the kernels of peanuts and the like.

The object of my invention is to provide a novel method of blanching peanuts by which the kernels may be efficiently and rapidly blanched.

The novel features of my invention are hereinafter fully described and claimed.

In the accompanying drawings, which illustrate the preferred embodiment of my invention, Figure 1 is a vertical sectional view, enlarged, on the line 1—1 of Fig. 3.

Fig. 2 is a horizontal sectional view on the line 2—2 of Fig. 1.

Fig. 3 is a vertical sectional view, reduced, on the line 3—3 of Fig. 1.

Fig. 4 is a vertical sectional view, enlarged, on the line 4—4 of Fig. 2.

Fig. 5 is a vertical sectional view on the line 5—5 of Fig. 4.

Fig. 6 is a vertical sectional view on the line 6—6 of Fig. 4.

Similar reference characters designate similar parts in the different views.

1 designates an inclosing casing provided with a supporting base 2 on which is mounted an inverted U-shaped supporting yoke 3 in which is rotatably mounted a vertical shaft 4 having secured to its lower end a fly wheel 5 and having secured to it a pulley 6 which is driven by a belt 7 which is connected with any suitable source of power, not shown.

Rigidly secured to the upper end of the shaft 4 is an abrading member comprising, preferably, a horizontally disposed circular corundum wheel 8 having, preferably, a flat upper surface.

The kernels of the peanuts are fed tangentially across the upper surface of the abrading wheel 8, that is transversely across a radial line which is perpendicular to the direction of movement of the kernels.

9 designates two hoppers supported on the casing 1 at opposite sides respectively of the shaft 4. Each hopper feeds into a vertical container 10 which is supported upon longitudinal horizontal bars 11 which are spaced apart, so as to provide channels 12, into which the kernels are dropped, by which they are guided tangentially across the upper surface of the abrading wheel 8. The kernels designated by 13' are free to rotate axially in the channels 12 between the bars 11. The kernels of each channel 12 are held against the wheel 8 by means of flat springs 13 which respectively bear against strips of canvas 14, the springs 13 and canvas strips 14 being attached at one set of ends to a block 15 secured to one vertical side of the adjacent container 10. The latter may be provided with inclined baffle plates 16 and 17.

18 designates horizontal set screws mounted in a U-shaped plate 19 which is attached to the block 15. The set screws bear respectively against the springs 13 in a manner such that by adjusting the set screws, the downward pressure of the springs 13 on the strips 14 may be varied.

The two hoppers 9 are disposed at opposite sides of a vertical plane which extends diametrically through the center of the wheel 8 and perpendicular to the guide bars 11. This diametrical plane is designated by A—B in the drawings, Figs. 2 and 4. The kernels 13' travel in a right line across the plane A—B, while in contact with the wheel 8. The kernels will thus travel in a direction substantially at right angles to and across the radial line A—B. Before the kernels cross the line A—B, the revolving wheel will cause the kernels to be rotated axially clockwise, as viewed in Fig. 5, that is when the wheel 8 is rotating counter-clockwise, as viewed in Fig. 2. After the kernels cross the line A—B, the revolving wheel 8 will cause the kernels 13' to rotate counter-clockwise, as viewed in Fig. 6. The revolving wheel 8 by means of its abrading surface tears the skins off from the kernels, thus effecting the blanching operation. By passing the kernels tangentially across the upper revolving surface of the abrading wheel 8, with the kernels held by gentle pressure due to the springs 13, the kernels will be first rotated axially in one direction, and then, after passing the radial line A—B, they will be rotated axially in the opposite direction. By thus rotating each kernel in opposite directions and in contact with the abrading surface, portions of the skins which will not be torn from the kernels while they are axially rotated in one direction, will be torn from the kernels when they are rotated in the opposite direction.

After the kernels have passed from under the springs 13, they will have been blanched and will be guided by the diverging discharge ends of the bars 11 into the upper ends of two vertical funnels, 20, preferably of canvas, and which at their lower ends discharge upon the upper side of a horizontal belt 21, mounted upon and driven by a horizontal roller 22 secured to a shaft 23, rotatably mounted in bearings 24, supported by the base 2. The shaft 23 has secured to it a driving pulley 25 which may be driven by any suitable source of power.

The funnels 20 are disposed at opposite sides respectively of the line A—B, as the kernels are fed from the two hoppers 9 and containers 10 upon revolving surfaces at opposite sides of a central vertical plane which intersects the plane A—B perpendicularly in the axis of the shaft 4. As viewed in Fig. 2, the kernels which are fed from the container 10 at the left of the line A—B, pass therefrom to the right through the channels 12 against the wheel 8 and into the right hand funnel 20. The kernels which are discharged from the container 10 at the right of the line A—B, Fig. 2, pass to the left in the channels 12 against the wheel 8 and into the left funnel 20. After the kernels drop upon the belt 21, they are carried thereby to a suitable place of delivery, not shown.

To prevent the kernels flying upwardly out of the channels 12 after they pass from under the ends of the strips 14, there are provided two canvas flaps 26, the inner free edges of which are supported in an upwardly curving position by means of cords 27 attached to transverse curved slots 28, to which the upper ends of the canvas funnels 20 are respectively attached.

Opposite ends of the bars 11 are supported respectively in horizontal transverse grooved bars 29, the ends of which are attached to and supported by the casing 1.

Yokes 30 are mounted on the two sets of bars 11, respectively.

Rigidly secured to the shaft 4 above the wheel 8 is a cam 31 which bears against two plates 32, respectively secured to the two adjacent bars 11. When the cam 31 rotates, it will effect a small lateral oscillation of the two sets of bars 11 and the two containers 10, thus agitating the kernels in said containers so as to effect reliable feeding of the kernels from the containers and preventing the kernels becoming bridged or jammed therein.

My invention provides an efficient and rapid method of blanching kernels of peanuts and the like.

I do not limit my invention to the specific steps nor structure herein described, as many modifications, within the scope of the appended claims, may be made without departing from the spirit of my invention.

What I claim is:—

1. The method of blanching the kernels of peanuts and the like, consisting in guiding the kernels, while permitting them to rotate, tangentially in contact with a revolving abrading surface, substantially as set forth.

2. The method of blanching the kernels of peanuts and the like, consisting in guiding the kernels tangentially and under pressure in contact with a revolving abrading surface, while permitting the kernels to rotate, substantially as set forth.

3. The method of blanching the kernels of peanuts and the like, consisting in guiding the kernels tangentially in contact with a flat revolving abrading surface, while permitting the kernels to rotate, substantially as set forth.

4. The method of blanching the kernels of peanuts and the like, consisting in guiding the kernels tangentially and under pressure in contact with a flat revolving abrading surface, while permitting the kernels to rotate, substantially as set forth.

5. The method of blanching the kernels of peanuts and the like, consisting in turning the kernels, first in one direction and then in the opposite direction in contact with an abrading surface, substantially as set forth.

6. The method of blanching the kernels of peanuts and the like, consisting in turning the kernels, first in one direction and then in the opposite direction in contact with a moving abrading surface, substantially as set forth.

7. The method of blanching the kernels of peanuts and the like, consisting in turning the kernels first in one direction and then in the opposite direction in contact with a flat moving abrading surface, substantially as set forth.

8. The method of blanching the kernels of peanuts and the like, consisting in yieldingly pressing the kernels against a revolving abrading surface, while permitting them to travel with the surface in a right line in a direction substantially at right angles to and across a radius of the surface, substantially as set forth.

9. The method of blanching the kernels of peanuts and the like, consisting in yieldingly pressing the kernels against a flat revolving abrading surface, while permitting them to rotate and to travel with the surface in a right line in a direction substantially at right angles to and across a radius of the surface, substantially as set forth.

In testimony whereof I have signed my name to this specification.

ROSCOE P. WITT.